(12) United States Patent
Kichikawa et al.

(10) Patent No.: US 7,574,440 B2
(45) Date of Patent: Aug. 11, 2009

(54) INFORMATION PROCESSING APPARATUS, AND METHOD FOR RETAINING SECURITY

(75) Inventors: Kazutoshi Kichikawa, Tokyo (JP); Yoshihiro Yano, Tokyo (JP); Takayuki Chikada, Tokyo (JP); Fukio Handa, Tokyo (JP); Syouzou Niwata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/588,322

(22) PCT Filed: Jan. 20, 2005

(86) PCT No.: PCT/JP2005/001044

§ 371 (c)(1),
(2), (4) Date: Aug. 3, 2006

(87) PCT Pub. No.: WO2005/081114

PCT Pub. Date: Sep. 1, 2005

(65) Prior Publication Data

US 2007/0143288 A1    Jun. 21, 2007

(30) Foreign Application Priority Data

Feb. 23, 2004    (JP)    ............................. 2004-045973

(51) Int. Cl.
*G06F 7/00*    (2006.01)
*G06F 17/30*    (2006.01)
(52) U.S. Cl. .................................... 707/9; 707/2; 707/8
(58) Field of Classification Search ........................ None
See application file for complete search history.

(56) References Cited

U.S. PATENT DOCUMENTS 5,179,685 A * 1/1993 Nojiri ........................... 712/41

(Continued)

FOREIGN PATENT DOCUMENTS

JP    6-309214    11/1994

(Continued)

OTHER PUBLICATIONS

IBM Technical Disclosure Bulletin, "User Logon Profile", Aug. 1, 1991, vol. 34, pp. 126-128, East TDB-ACC-No. NN9108126.*

*Primary Examiner*—Mohammad Ali
*Assistant Examiner*—Angelica Ruiz
(74) *Attorney, Agent, or Firm*—Ladas and Parry LLP

(57) ABSTRACT

When a user, who has logged onto an information processing apparatus (100), executes a logoff procedure, a saving unit (160) executes the following processes. Firstly, from among the files residing in a data storage unit (110), any files that are recognized as requiring a security protection and hence are to be saved are copied into an external storage device (300) via a network (200), and the original files in the data storage unit (110) are then deleted. At this moment, the address of the copy destination is stored, as management information, into a portable information recording medium (400) possessed by the user. When the user logs onto the information processing apparatus (100) again, a restoring unit (170) restores, based on the management information stored in the portable information recording medium (400), the files saved in the external storage device (300) into the data storage unit (110). In this way, a sufficient security can be retained when a plurality of users share a single information processing apparatus.

13 Claims, 4 Drawing Sheets

U.S. PATENT DOCUMENTS

| | | | | |
|---|---|---|---|---|
| 5,774,551 A * | 6/1998 | Wu et al. | | 713/155 |
| 5,813,009 A * | 9/1998 | Johnson et al. | | 707/100 |
| 6,094,654 A * | 7/2000 | Van Huben et al. | | 707/8 |
| 6,347,331 B1 * | 2/2002 | Dutcher et al. | | 709/203 |
| 6,411,943 B1 * | 6/2002 | Crawford | | 705/400 |
| 6,427,140 B1 * | 7/2002 | Ginter et al. | | 705/80 |
| 6,640,304 B2 * | 10/2003 | Ginter et al. | | 713/193 |
| 6,704,873 B1 * | 3/2004 | Underwood | | 726/12 |
| 6,711,594 B2 * | 3/2004 | Yano et al. | | 707/204 |
| 6,917,958 B1 * | 7/2005 | Howe et al. | | 709/203 |
| 7,095,854 B1 * | 8/2006 | Ginter et al. | | 380/233 |
| 7,100,195 B1 * | 8/2006 | Underwood | | 726/2 |
| 2002/0010651 A1 * | 1/2002 | Cohn et al. | | 705/26 |
| 2002/0013829 A1 * | 1/2002 | Kishimoto | | 709/219 |
| 2002/0138504 A1 * | 9/2002 | Yano et al. | | 707/204 |
| 2003/0005287 A1 * | 1/2003 | Wray et al. | | 713/155 |
| 2003/0154403 A1 * | 8/2003 | Keinsley et al. | | 713/201 |
| 2003/0182586 A1 * | 9/2003 | Numano | | 713/202 |
| 2004/0054630 A1 * | 3/2004 | Ginter et al. | | 705/53 |
| 2004/0117460 A1 * | 6/2004 | Walsh et al. | | 709/219 |
| 2004/0193658 A1 * | 9/2004 | Kawamura et al. | | 707/202 |
| 2004/0205176 A1 * | 10/2004 | Ting et al. | | 709/223 |
| 2005/0050054 A1 * | 3/2005 | Clark et al. | | 707/100 |
| 2005/0102491 A1 * | 5/2005 | Yamamoto | | 712/202 |

FOREIGN PATENT DOCUMENTS

| | | |
|---|---|---|
| JP | 6-332781 | 12/1994 |
| JP | 2003-101739 | 4/2003 |
| JP | 2003-280781 | 10/2003 |
| JP | 2004-038519 | 2/2004 |
| WO | 01/46808 | 6/2001 |

* cited by examiner

BEFORE SAVING PROCESS
(a)

AFTER SAVING PROCESS
(b)

PRELIMINARY RESTORING PROCESS
(a)

MAIN RESTORING PROCESS
(b)

INFORMATION PROCESSING APPARATUS, AND METHOD FOR RETAINING SECURITY

TECHNICAL FIELD

The present invention relates to an information processing apparatus and a method for ensuring security in an information processing apparatus, and particularly relates to an art for ensuring security of data prepared by each individual user when a plurality of users share a single information processing apparatus.

BACKGROUND ART

An information processing apparatus, such as a personal computer, is often shared by a plurality of users. An operating system (referred to hereinafter simply as "OS") for a personal computer or other information processing apparatus is thus equipped with functions premised on shared use by a plurality of users. For example, in a basic form of use of a representative recent OS, such as UNIX, Windows XP (registered trademark), or Mac OSX (registered trademark), each individual user performs a logon procedure (referred to as a "login procedure" depending on the OS) in starting the use of a system and performs a logoff procedure (referred to as a "logout procedure" depending on the OS) in ending the use of the system.

Under such an environment where a plurality of users share the same information processing apparatus, it is important that considerations be made to ensure adequate security in regard to data prepared by each individual user. For example, if a data file prepared by a first user can be subject to reading and writing without restriction by a second user, files that a user does not wish others to view or modify cannot be handled with an information processing device under a shared environment.

Thus in order to ensure security for each individual user even in an information processing apparatus under a shared environment, an arrangement that prevents simultaneous multiple logon by a plurality of users is employed and operations are carried out with each individual user being provided with unique access rights. For example, Japanese Unexamined Patent Publication No. 2003-280781 discloses a method in which different access rights are set according to each individual user and when a user who is logged in changes, the access rights are switched as well.

As mentioned above, in cases where the same information processing device is shared by a plurality of users, a method, in which unique access rights are set according to each individual user and, for a user who has logged on using a predetermined account and password, access to data files is permitted within the range of the access rights set for the user, is employed in many OSs. However, with such a method, an adequate security cannot be ensured necessarily. For example, with many OSs, the existence of a special user (such as a super user in UNIX) having management rights is allowed, and when a user logs in as such a special user, all data files can be accessed without being restricted whatsoever. Also, as long as data files are stored in the information processing apparatus, any of the data can be accessed using an illicit method.

Thus an object of the present invention is to provide a method that enables a more adequate security to be ensured for data prepared by each individual user in cases where the same information processing apparatus is shared by a plurality of users.

DISCLOSURE OF INVENTION (1) The first feature of the present invention resides in an information processing apparatus comprising:

a data storage unit for storing data files;

a memory for spreading data files, stored in the data storage unit, as necessary;

a user management unit, preventing multiple logon by a plurality of users by prohibiting, after a predetermined user has performed a logon procedure, logon procedures by other users until a logoff procedure concerning said predetermined user is performed;

an spreading/storing unit, executing, based on an operation of a user who is logged on, a file spreading process of spreading a predetermined data file, stored in the data storage unit, onto the memory, and a file storing process of storing a predetermined data file, spread on the memory, into the data storage unit;

a program executing unit, executing, based on an operation of a logged-on user, a predetermined application program and a process of preparing a new data file on the memory or a renewing process on an existing data file spread on the memory;

a saving unit, executing, when a specific user executes the logoff procedure, a saving object recognizing process of recognizing, from among data files stored in the data storage unit, all or a predetermined portion of data files prepared or renewed based on tasks by the specific user as a saving object file or files, a saving process of copying and thereby saving the saving object file or files into an external storage device via a network, a deleting process of deleting the saving object file or files stored in the data storage unit, a management information preparing process of preparing management information necessary for copying and restoring the saving object file or files, saved in the external storage device, into the data storage unit, and a management information storing process of storing the prepared management information into an external storage location; and a restoring unit, executing, as necessary after the specific user executes the logon procedure, a restoring process of referencing the management information and thereby copying and restoring the saving object file or files, saved in the external storage device, into the data storage unit.

(2) The second feature of the present invention resides in an information processing apparatus according to the first feature, wherein the restoring unit executes a preliminary restoring process of restoring a hierarchical structure of data files at a time of storage, and a main restoring process of restoring a specific data file selected from within the hierarchical structure restored by the preliminary restoring process.

(3) The third feature of the present invention resides in an information processing apparatus according to the first or second feature, wherein the saving unit recognizes a data file that is stored in a priorly determined saving object folder as being the saving object file.

(4) The fourth feature of the present invention resides in an information processing apparatus according to the first or second feature, wherein the saving unit recognizes a data file, having a file name with a priorly determined extension attached thereto, as being the saving object file.

(5) The fifth feature of the present invention resides in an information processing apparatus according to the first to fourth features, wherein the saving unit, in executing the management information storing process, stores the management information into a removable, portable information recording medium, and the restoring unit, in executing the restoring process, references the management information stored in the portable information recording medium.

(6) The sixth feature of the present invention resides in an information processing apparatus according to the first to fifth features, wherein address information on the external storage device that is to be a saving destination of the saving object file is used as the management information.

(7) The seventh feature of the present invention resides in an information processing apparatus according to the first to fourth features, wherein the saving unit executes, in executing the saving process, a process of dividing a saving object file into a plurality of division files based on a predetermined dividing method and saving the individual division files respectively into mutually different storage devices and has a function of preparing management information that includes information indicating the predetermined dividing method, and the restoring unit restores the saving object file based on the information indicating the predetermined dividing method that is included in the management information.

(8) The eighth feature of the present invention resides in an information processing apparatus according to the first to seventh features, wherein the saving unit executes, in executing the saving process, a process of saving a saving object file into the external storage device upon encrypting the file based on a predetermined encrypting method and has a function of preparing management information that includes information indicating the predetermined encrypting method, and the restoring unit restores the saving object file by executing a decrypting process based on the information indicating the predetermined encrypting method that is included in the management information.

(9) The ninth feature of the present invention resides in an information processing apparatus according to the first to eighth features, wherein in executing the deleting process, the saving unit performs a process of deleting even a saving object file that is spread in the memory.

(10) The tenth feature of the present invention resides in a computer program that makes a computer function as the information processing apparatus according to the first to ninth features, or a computer-readable recording medium recording said program.

(11) The eleventh feature of the present invention resides in a method for ensuring security of data according to each individual user when an information processing device, comprising:

a data storage unit for storing data files;

a memory for spreading a data file, stored in the data storage unit, as necessary;

a user management unit, preventing multiple logon by a plurality of users by prohibiting, after a predetermined user has performed a logon procedure, logon procedures by other users until a logoff procedure concerning said predetermined user is performed;

a spreading/storing unit, executing, based on an operation of a user who is logged on, a file spreading process of spreading a predetermined data file, stored in the data storage unit, onto the memory, and a file storing process of storing a predetermined data file, spread on the memory, into the data storage unit; and a program executing unit, executing, based on an operation of a logged-on user, a predetermined application program and a process of preparing a new data file on the memory or a renewing process on an existing data file spread on the memory;

is shared by a plurality of users, the method for ensuring security in information processing apparatus being characterized in making the information processing apparatus perform:

a saving step of executing, when a specific user executes a logoff procedure, a saving object recognizing process of recognizing, from among data files stored in the data storage unit, all or a predetermined portion of data files prepared or renewed based on tasks by a specific user as a saving object file or files, a saving process of copying and thereby saving the saving object file or files into an external storage device via a network, a deleting process of deleting the saving object file or files stored in the data storage unit, a management information preparing process of preparing management information necessary for copying and restoring the saving object file or files, saved in the external storage device, into the data storage unit, and a management information storing process of storing the prepared management information into an external storage location; and a restoring step of executing, as necessary after the specific user executes the logon procedure, a restoring process of referencing the management information and thereby copying and restoring the saving object file or files, saved in the external storage device, into the data storage unit.

(12) The twelfth feature of the present invention resides in a security ensuring method according to the eleventh feature, wherein the restoring step comprises a preliminary restoring step of restoring a hierarchical structure of data files at a time of storage, and a main restoring step of restoring a specific data file selected from within the hierarchical structure restored by the preliminary restoring step.

(13) The thirteenth feature of the present invention resides in a computer program that makes a computer execute the saving step and the restoring step of the security ensuring method according to the eleventh or twelfth feature or a computer-readable recording medium recording said program.

In the information processing apparatus and the method for ensuring security in an information processing apparatus according to the present invention, at a time when a user executes a logoff procedure, a saving object file for which security is to be ensured is saved into an external storage device and the original file in the data storage unit is deleted so that the saving object file is not remain in the information processing apparatus. Therefore, when the information processing apparatus is shared by a plurality of users, a more adequate security can be ensured.

BEST MODE FOR CARRYING OUT THE INVENTION

The present invention shall now be described based on an illustrated embodiment.

<<<Section 1. Basic Arrangement of an Information Processing Apparatus>>>

Figure 1:
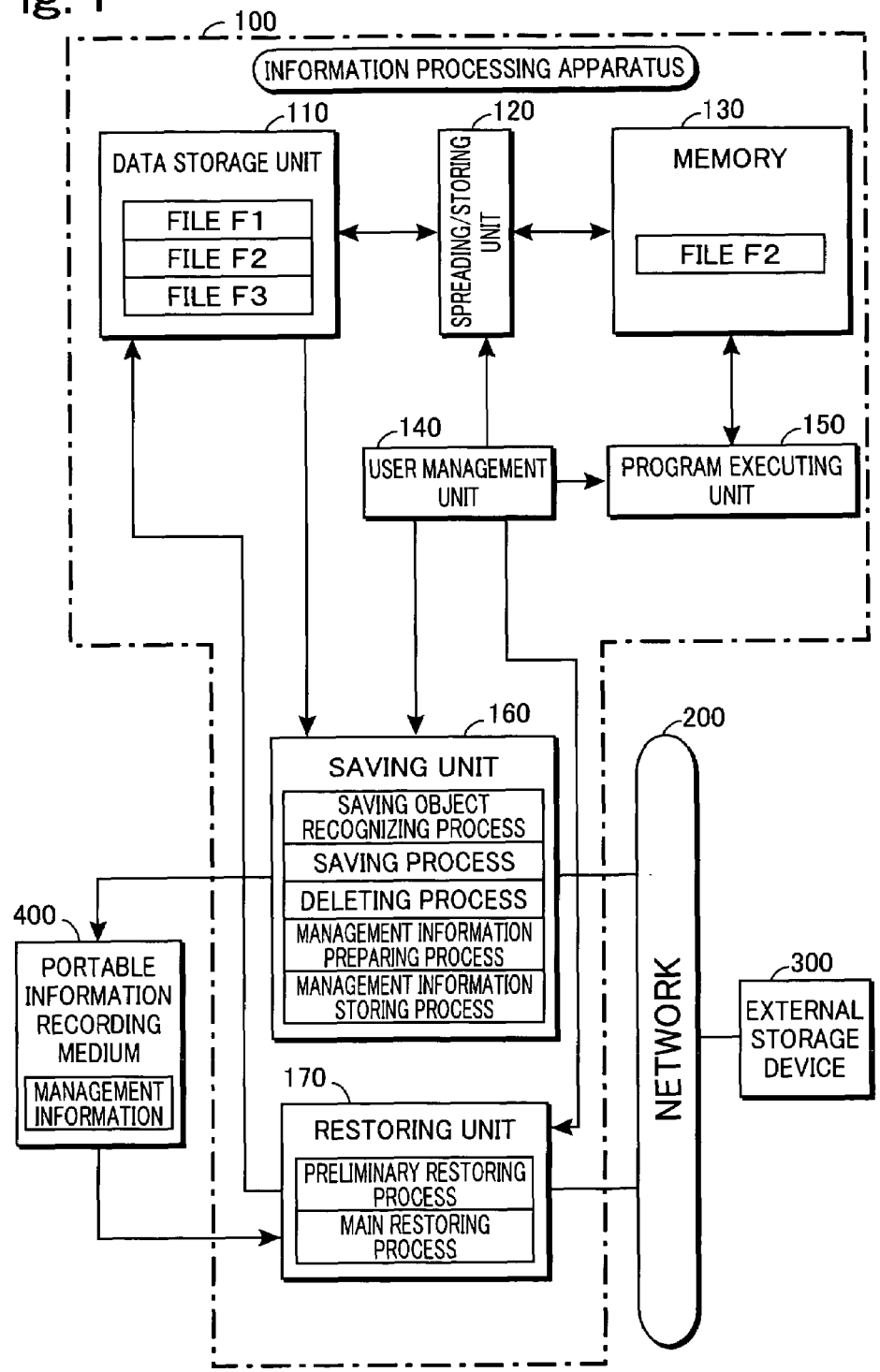
FIG. 1 is a block diagram of an operation state of an information processing apparatus 100 according to an embodiment of the present invention.

FIG. 1 is a block diagram of an operation state of an information processing apparatus 100 according to an embodiment of the present invention. In FIG. 1, the portion surrounded by the alternate long and short dash line is information processing apparatus 100 according to the present invention. As illustrated, this information processing apparatus 100 includes a data storage unit 110, an spreading/storing unit 120, a memory 130, a user management unit 140, a program executing unit 150, a saving unit 160, and a restoring unit 170. Among these respective components, data storage unit 110, spreading/storing unit 120, memory 130, user management unit 140, and program executing unit 150 are components equipped in a conventional, general information processing apparatus 100, and saving unit 160 and restoring unit 170 are components unique to the present invention.

Information processing apparatus 100 is arranged from a so-called computer, and here in particular, an example in which information processing apparatus 100 is arranged from a general-purpose personal computer shall be described. Data storage unit 110 is a component for storing data files and is generally arranged from a built-in or external hard disk device in the case of a personal computer. As a matter of course, data storage unit 110 may instead be arranged from a magneto-optic disk device or a rewritable optical disk device (such as a CD-RAM device, etc.). Meanwhile, memory 130 is a component for spreading data files, stored in data storage unit 110, as necessary and is normally arranged from a RAM.

Whereas data storage unit 110 functions as a storage area for data files, memory 130 functions as a working area for data files. Spreading/storing unit 120 is a component that performs, as necessary, a file spreading process of spreading predetermined data files, stored in data storage unit 110, onto memory 130, and a file storing process of storing predetermined data files which are spread on memory 130, into data storage unit 110. When a personal computer is used as information processing apparatus 100, spreading/storing unit 120 is realized as a portion of functions of an OS program.

When a user executes a predetermined processing task on a data file in data storage unit 110 by means of an application program, the data file in data storage unit 110 to be subject to the task is first spread onto memory 130 by the file spreading process of spreading/storing unit 120. This task is normally started by the application program as a process of opening the data file to be subject to the task. A state, in which a process of opening a file F2, among three data files F1 to F3 stored in data storage unit 110, has been performed, is shown in FIG. 1. Data file F2, which was stored in data storage unit 110, is put in a state of being spread on memory 130.

Program executing unit 150 has functions of executing predetermined application programs and executing a renewing process on existing data files spread on memory 130. In the illustrated example, program executing unit 150 executes the predetermined renewing process on data file F2 that is spread on memory 130. The details of the renewing process applied to data file F2 are various and depend on the type of the application program and operations executed by the user. Program executing unit 150 is thus arranged from a means for storing predetermined application programs and an arithmetic processing means for executing the application programs.

As mentioned above, memory 130 is a component that functions as an area for performing tasks on data files and only serves a role of temporarily holding data files subject to tasks by application programs. A data file on memory 130 for which predetermined tasks have been completed is thus stored again into data storage unit 110. This task is normally started by an application program as a process of storing the data file that had been subject to tasks. In this case, if storing is performed using the same file name as the original file name, so-called overwriting is performed, and if storing is performed using another file name, the data file is stored as a new data file. In the illustrated example, when tasks on data file F2, spread on memory 130, are completed and the renewing process is performed with storing under the same file name of "F2," data file F2 inside data storage unit 110 is rewritten (overwritten) by the renewed data file F2 on memory 130. On the other hand, if storing under another file name, such as "F4," is performed, a data file of the file name, "F4," is added anew, with data file F2, stored in data storage unit 110, remaining as it is.

Program executing unit 150 also has a function of performing a process of preparing a new data file on memory 130 by executing a predetermined application program. This function is normally started as a task of preparing the new file by means of the application program. In the final stage, the data file that is newly prepared on memory 130 is stored into data storage unit 110 by the storing process.

The data spreading process and the data storing process by spreading/storing unit 120 and the process of execution of predetermined application programs by program executing unit 150 are all carried out based on input operations that the user performs on information processing apparatus 100, and in the case of information processing apparatus 100 premised on being shared by a plurality of users, each individual user starts tasks on information processing apparatus 100 by performing a predetermined logon procedure and ends the tasks on information processing apparatus 100 by performing a predetermined logoff procedure. Here, "logon" refers to the inputting of a predetermined account (user name) and, where necessary, a predetermined password by a predetermined user to secure a state of use of information processing apparatus 100, and "logoff" refers to the ending of the state of use by the user who is currently logged on. Though depending on the OS, the term, "login," may be used in place of "logon," and the term, "logout," may be used in place of "logoff," these have the same definitions as far as this Description is concerned. Also, though depending on the OS, a shutdown operation (operation of ending the function of the OS and turning off the power) can be performed without performing the logoff procedure, the logoff procedure according to this Description shall include the ending of the usage state by such a shutdown operation.

User management unit 140 is a component that, in order to prevent multiple logon by a plurality of users, performs user management in a manner such that when a logon procedure has been performed by a predetermined user, logon procedures by other users are rejected until the logoff procedure is performed for the abovementioned user. With recent OSs for personal computers, this function of user management unit 140 is equipped as standard as part of the functions of the OS program.

With the present embodiment, user management unit 140 not only has the function of performing user management so that multiple logon will not be performed but also has a function of managing access rights with respect to the user who is currently logged on. That is user management unit 140 has a function of registering access rights of a plurality of users in advance and performs a supervision process of recognizing who the currently logged on user is and allowing spreading/storing unit 120 and program executing unit 150 to perform only processing operations within the range of the access rights of this user. For example, when a user, who is not provided with any rights to read and write data files prepared by other users, is logged on, processing operations of spreading/storing unit 120 that attempt to spread a data file prepared by another user are not permitted by the user management unit 140. Likewise, when a user, who is provided with rights to read data files prepared by other users but is not provided with rights to write data files prepared by other users, is logged on, user management unit 140 prohibits processing operations of program executing unit 150 that attempt to modify data prepared by another user and processing operations of spreading/storing unit 120 that overwrite modified data in data storage unit 100.

The functions of data storage unit 110 through program executing unit 150, among the components of information processing apparatus 100, have been described above, and the respective functions of these five components are all functions that are equipped as standard by recent personal computer OSs, and information processing apparatus 100, equipped with these five components, can be said to be a standard personal computer having incorporated therein a recent OS (for example, Windows XP (registered trademark), MAC OSX (registered trademark), UNIX, etc.). With this standard personal computer, since the OS is designed on a premise of shared use by a plurality of users, a user who starts usage is required, as a rule, to perform the logon procedure using a predetermined user name and is permitted access to individual data files within the range of access rights set under the user name as described above.

However, as mentioned previously, an adequate security cannot necessarily be ensured with such a method. For example, when login as a special user with manager rights, such as the super user in UNIX, is performed, all data files can be accessed without any restriction whatsoever. Also, as long as data files are stored in data storage unit 110, any data file can be accessed using an illicit method.

<<<Section 2. Basic Characteristics of the Invention>>>

As described in Section 1, an object of the present invention is to ensure more adequate security in regard to data prepared by each individual user in cases where the same information processing apparatus 100 is shared by a plurality of users. Information processing apparatus 100 according to the present invention thus has added thereto saving unit 160 and restoring unit 170, which are components unique to the present invention. Also in carrying out the present invention, an environment, in which information processing apparatus 100 can be connected to a network 200 and can use an external storage device 300 connected to network 200, is required.

Presently, the use of a personal computer or other information processing apparatus 100 with it being connected to network 200 is becoming a generally practiced form of use, and many information processing apparatuses 100 are thus already furnished with an environment for connection to network 200. As network 200, a corporate LAN or other local network may be used or the Internet may be used. As external storage device 300, any device may be used as long as it is a storage device that can be accessed via this network 200. Generally, the use of a data server, backup server, or other server device as external storage device 300 is convenient. Many personal computers and other existing information processing apparatuses 100 are thus generally set up under an environment in which external storage device 300 is accessed via network 200, and with such an information processing apparatus 100, the present invention can be carried out using the existing environment as it is.

In carrying out the present invention, a storage location for storing management information outside information processing apparatus 100 must be prepared. In the example shown in FIG. 1, a portable information recording medium 400 is used as this storage location. Specifically with the present embodiment, an IC card is used as portable information recording medium 400. Since a dedicated reader/writer device is normally required to perform access to an IC card, in the present embodiment, a reader/writer device is connected to the personal computer used as information processing apparatus 100, and access of the IC card from the personal computer is enabled by insertion of the IC card into the reader/writer device. Obviously, the IC card is a portable information recording medium 400 that is removable and can be removed from reader/writer device and carried at any time.

Saving unit 160 and restoring unit 170 are thus the components that are provided anew in the interior of information processing apparatus 100 to carry out the present invention. A basic concept of the present invention is that, when a specific user executes the logoff procedure, the data files that the specific user stored in data storage unit 110 are saved into external storage device 300 and the data files inside data storage unit 110 are deleted. Saving unit 160 is a component that executes processes to achieve this saving. Because by these processes of saving, data files prepared by the user are deleted from and becoming non-existent in information processing apparatus 100, even when another user logs onto information processing apparatus 100 thereafter, adequate security can be ensured. Obviously, when the specific user logs on again, the data files saved in external storage device 300 must be restored inside data storage unit 110. Restoring unit 170 is a component that performs this restoring process. Functions of saving unit 160 and functions of restoring unit 170 shall now be described in detail.

As shown in FIG. 1, saving unit 160 has five processing functions. Each of these functions is executed when a user who is currently logged on performs the logoff procedure. As mentioned above, the user logon procedure and logoff procedure are processed by user management unit 140. When the currently logged-on user executes the logoff procedure, user management unit 140 reports this to saving unit 160 and thereby urges the execution of the five processing functions.

A saving object recognizing process, which is executed first at saving unit 160, is a process of recognizing, from among the data files stored in data storage unit 110 when the specific user executes the logoff procedure, all or a predetermined portion of data files prepared or renewed based on tasks of the specific user as files to be saved, that is, as saving object files. In the illustrated example, suppose that the currently logged-on user is referred to as "user AAA" and that three data files F1, F2, and F3 have been prepared or renewed based on tasks performed during logon of user AAA. In this case, the three data files F1, F2, and F3 are stored inside data storage unit 110. Here, if all of the data files prepared or renewed based on tasks of user AAA are to be recognized as the saving object files, when user AAA executes the logoff procedure, all of the three data files F1, F2, and F3 stored in data storage unit 110 become recognized as saving object files in the illustrated example.

A second process executed by saving unit 160 is a saving process of saving the saving object files by copying the files into external storage device 300 via network 200. With the above-described example, since all of the three data files F1, F2, and F3 stored in data storage unit 110 are recognized as saving object files, all of the three data files F1, F2, and F3 are copied into external storage device 300 via network 200. This copying process itself is a task equivalent to a so-called backup process.

A third process executed at saving unit 160 is a deleting process of deleting the saving object files stored in data storage unit 110. The saving process thus differs from a general backup process in that it accompanies this deleting process. Though saving object files F1, F2, and F3 are copied into external storage device 300 by the above-described saving process, since the original saving object files F1, F2, and F3 inside data storage unit 110 that is the copy source are deleted by this deleting process, the above-described saving process does not have the significance of being a backup process.

As methods of deleting a data file stored in a hard disk device or other data storage unit 110, there is known a method of deleting the data file from a corresponding directory (the method of rewriting the directory so that the corresponding file is deemed as being non-existent in terms of the directory) and a method of completely deleting the data file itself by overwriting the actual data record area with other data, and either method may be employed in carrying out the present invention. Though the latter method is preferable over the former method in terms of ensuring higher security, in terms of the load of the deleting process, the former method is lighter in load than the latter method.

A fourth process executed by saving unit 160 is a management information preparing process of preparing management information which is necessary for restoring the saving object files, saved in external storage device 300, into data storage unit 110 in the future. The management information prepared here may be information of any form as long it enables the saving object files, saved in external storage device 300, to be copied and restored into data storage unit 110, and generally, address information on external storage device 300 that is the saving destination of the saving object files is used as the management information. For example, if the Internet is used as network 200 and a data server connected to the Internet is used as external storage device 300, the URL addresses of the saving object files on this data server are used as the management information. In the case of the above-described example, since saving object files F1, F2, and F3 are copied into predetermined saving locations inside external storage device 300 by the saving process, the URL addresses indicating these saving locations are prepared as the management information. For practical use, information, indicating that the management information is that which has been prepared in the logoff procedure of user AAA, is preferably included in the management information.

A fifth process executed by saving unit 160 is a management information storing process of storing the prepared management information into an external storage location. With the example shown in FIG. 1, portable information recording medium 400 (specifically, an IC card) is prepared as the external storage location for storing the management information. The management information is thus stored inside this portable information recording medium 400. In the final stage, user AAA, who has completed the logoff procedure, carries portable information recording medium 400 upon removing it from information processing apparatus 100. Specifically, a task of ejecting and thereby taking out the IC card that is portable information recording medium 400 from the reader/writer device connected to the personal computer that is information processing apparatus 100 is performed.

By the respective processes described above, the logoff procedure of user AAA is completed. As a result of executing such a logoff procedure, data files F1, F2, and F3, which user AAA worked on while logged on, are deleted from inside data storage unit 110. Thus even if a second user BBB performs the logon procedure on information processing apparatus 100 thereafter, user BBB will not be able to access the data files F1, F2, and F3 worked on by user AAA. Since data files F1, F2, and F3 do not exist inside data storage unit 110 to start with, even if user BBB is a special user with manager rights or performs access by illicit means, the files are in a state in which they cannot be accessed physically.

As a matter of course, in order to disable access in the strict sense, the method of completely deleting the data files themselves by overwriting other data in the actual data record area in data storage unit 110 is preferably employed. Even if data are left spread in memory 130 at the point at which user AAA logs off, since access to the data by a normal method normally becomes impossible at the point at which the application program, by which tasks were performed on the data, is ended, it is difficult for the other user BBB, who logs on later, to access data files left inside memory 130. However, if there is a need to ensure a more advanced degree of security, a process of deleting even the saving object files spread in memory 130 may be performed in executing the deleting process on the saving object files in data storage unit 110. With the illustrated example, the deleting process is performed on data file F2 spread on memory 130 as well. Specifically, a task of overwriting the RAM area, making up memory 130, with random data is executed.

Obviously, exactly the same procedure is executed when second user BBB performs the logoff procedure. That is, saving object files prepared inside data storage unit 110 by tasks of user BBB are copied by saving unit 160 to predetermined address locations inside external storage device 300 and thereafter, the original files inside data storage unit 110 are deleted. In this process, management information necessary for restoration is prepared and this management information is stored in a portable information recording medium 400 (IC card) for user BBB.

Thus with the embodiment described here, each of the users sharing information processing apparatus 100 owns a unique portable information recording medium 400 (IC card), puts this portable information recording medium 400 in a state of connection with information processing apparatus 100 (state of insertion of the IC card in the reader/writer device) before performing the logon procedure on information processing apparatus 100, and in completing the logoff procedure, puts portable information recording medium 400 in a state of removal from information processing apparatus 100 (state of ejection of the IC card from the reader/writer device).

With the present invention, since data files that a specific user worked on while logged on can be deleted from within information processing apparatus 100 by the logoff procedure of the specific user, even when the same information processing apparatus 100 is shared by a plurality of users, access to files worked on by another user is made impossible regardless of the access rights that a user has. Adequate security can thus be ensured for data prepared by each individual user.

When each user performs the logon procedure again to use information processing apparatus 100 to view or renew the contents of data files worked on in the past, the process of restoring the saved data files into data storage unit 110 must be performed. Consider a case where first user AAA performs the logon procedure again after second user BBB performs the logoff procedure in the above-described example. In this case, a process of restoring saving object files F1, F2, and F3 from external storage device 300 into data storage unit 110 must be performed. The component that performs such a restoring process is restoring unit 170. That is, restoring unit 170 executes the restoring process, in which, after a specific user has executed the logon procedure, the management information inside portable information recording medium 400 is referenced and saving object files saved in external storage device 300 are copied and restored into data storage unit 110.

As described above, with the present embodiment, each individual user has a unique portable information recording medium 400 (IC card) and before performing the logon procedure on information processing apparatus 100, puts this portable information recording medium 400 into a state of being connected to information processing apparatus 100. For example, in performing the logon procedure on information processing apparatus 100, user AAA performs the task of inserting the IC card that he/she owns into the reader/writer device. Upon recognizing the login procedure by user AAA, user management unit 140 reports this to restoring unit 170 and urges restoring unit 170 to execute the restoring process. Restoring unit 170 references the management information inside portable information recording medium 400 (the IC card inserted by user AAA) to recognize the saving location addresses (predetermined addresses inside external storage device 300) of saving object files F1, F2, and F3 that were saved during the previous logoff and executes the process of copying and restoring these files into data storage unit 110.

When such a restoring process is executed, data files F1, F2, and F3 are put in a state of being stored inside data storage unit 110 again and user AAA can thus execute renewing processes by means of program executing unit 150 on these data files as necessary upon spreading the files on memory 130. Obviously when user AAA performs the logoff procedure again, data files F1, F2, and F3 are saved into external storage device 300 again and deleted from within data storage unit 110.

Preferably for practical use, the saving process by saving unit 160 is arranged to be performed automatically when the user performs the logoff procedure, and the restoring process by restoring unit 170 is arranged to be performed automatically when the user performs the logon procedure. By doing so, the saving process and the restoring process are performed without the user being aware whatsoever, and the operations of saving unit 160 and restoring unit 170 that are characteristics of the present invention become hidden operations that the user is not concerned with. Though the present invention is characterized in that saving unit 160 and restoring unit 170 are added to a personal computer or other existing information processing apparatus, the operability of the personal computer to which the present invention is applied does not differ in any way from an existing personal computer, at least from the viewpoint of a general user.

When the restoration of data files from external storage device 300 has been performed, the data files in external storage device 300 that had been subject to restoration may be deleted or left as they are. If the storage capacity of external storage device 300 is to be saved as much as possible, a process of deleting the data files, subject to the restoring process by restoring unit 170, from within external storage device 300 may be performed. Or, a method may be employed in which the data files in external storage device 300 are left as they are and, in performing the saving process again on data files with the same file names, just the difference data with respect to the previous saving are copied.

<<<Section 3. Various Practical Arrangements>>>

In Section 2 above, a basic embodiment of the present invention was described. Various arrangements that are more practical in carrying out the present invention shall be described in this section.

(1) Selection of Saving Object Files

Though with the above-described basic embodiment, when specific user AAA executes the logoff procedure, all of the data files prepared or renewed by the tasks of specific user AAA are recognized, from among the data files stored in data storage unit 110, as the saving object files, instead of recognizing all of such files, a predetermined portion of such files may be selected and recognized as the saving object files. This is because normally, security may not have to be ensured necessarily equally for all data files.

To make just a portion of the data files worked on by the user be the saving object files, standards for selection of the saving object files are set in advance. For example, a predetermined folder is set as a saving object folder, and when saving unit 160 performs the saving object recognizing process, the data files stored in this saving object folder are made to be recognized as the saving object files.

Figure 2:
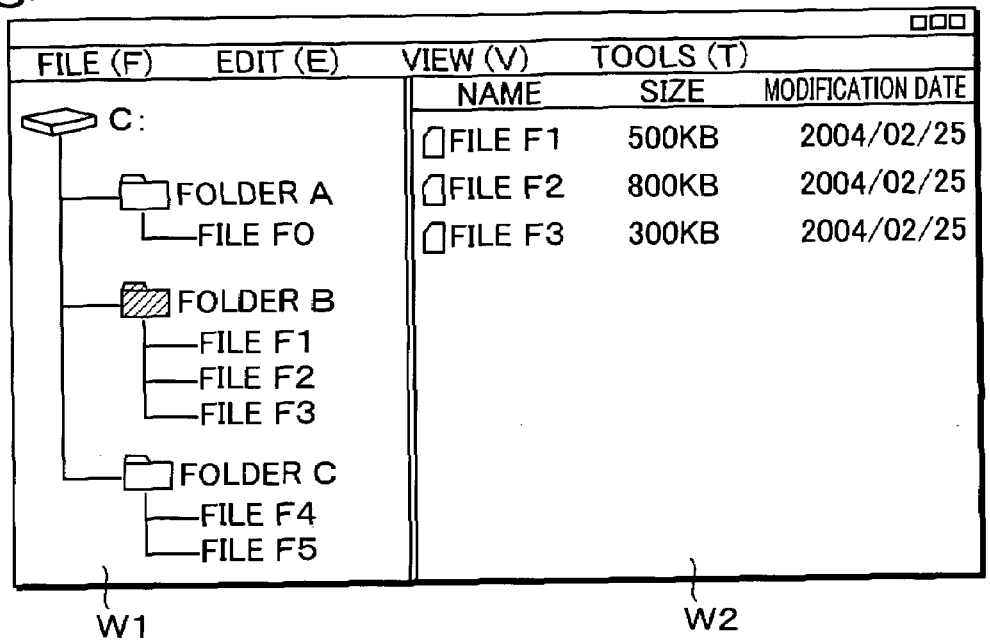
FIG. 2 is a diagram of an example of a window display showing a hierarchical structure of data files stored in a data storage unit 110 in information processing apparatus 100 shown in FIG. 1.

FIG. 2 is a diagram of an example of a window display showing a hierarchical structure of data files stored in data storage unit 110. In the illustrated example, an overall image of the hierarchical structure in data storage unit 110 is displayed in a left window W1, and the contents of a specific folder B, selected from within left window W1 (the selected state is indicated by hatching in the FIGURE), are shown in a right window W2. In this example, the entirety of data storage unit 110 is indicated as a volume named "C," and three folders A, B, and C are prepared immediately within this volume. A file F0 is stored in folder A, files F1, F2, and F3 are stored in folder B, and files F4 and F5 are stored in folder C.

Here, suppose that file F0, stored in folder A, is a data file that is used in relation to the OS and does not present a security problem even if accessed by other users. Furthermore, suppose that files F4 and F5, stored in folder C, are data files that user AAA has prepared using predetermined application programs but, due to their properties, also do not present problems in terms of security. In this case, just files F1, F2, and F3, stored in folder B, may give rise to problems in terms of security.

Figure 3:
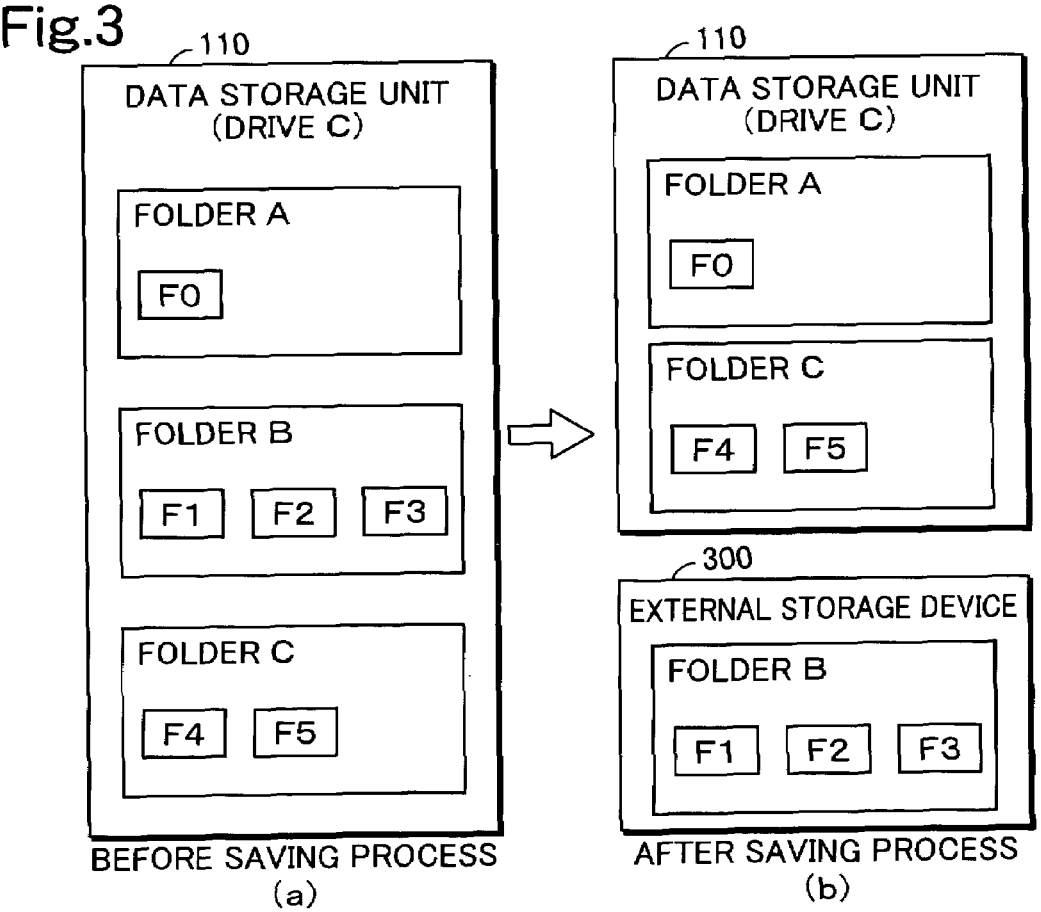
FIG. 3 concerns information processing apparatus 100 shown in FIG. 1, with FIG. 3(*a*) being a diagram showing a state of data storage unit 110 prior to a saving process and FIG. 3(b) being a diagram showing states of data storage unit 110 and an external storage device 300 after the saving process.

In this case, folder B is set to be the saving object folder in advance. By doing so, when saving unit 160 executes the saving object recognizing process, files F1, F2, and F3, stored in saving object folder B, can be recognized to be the saving object files. As a result, the saving process is executed as shown in FIG. 3. FIG. 3(a) shows a state of data storage unit 110 prior to the saving process, and FIG. 3(b) shows states of data storage unit 110 and external storage device 300 after the saving process. As illustrated, folder B, inside data storage unit 110, is copied as it is into external storage device 300 and is deleted from within data storage unit 110. Consequently, only folders A and C are left inside data storage unit 110.

Though it is possible for files F0, F4, and F5 in folders A and C to be accessed by other users, these files do not present problems in terms of security as mentioned above.

The process of saving files into external storage device 300 via network 200 places a corresponding workload on information processing apparatus 100. The restoring process that is performed thereafter applies a similar workload. Thus for practical use, it is preferable that files be classified between files requiring the ensuring of security and files not requiring the ensuring of security and that only the former files to be handled as the saving object files. A method of setting predetermined files in advance as the saving object files as in the above-described example is convenient in enabling the saving object files to be selected by the user's own judgment. In the case of the above-described example, the user classifies the files by placing the files requiring the ensuring of security in folder B and placing other files in folder C.

The method of performing selection of the saving object files is not restricted to the method of setting a saving object folder. For example, a method may be employed in which data files, having predetermined extensions attached to the file names, are recognized as the saving object files. With a general OS, for each individual file, an extension that specifies the format of the file or the application program used to prepare the file is attached to the file name. For example, "txt" in a file name, "ABC.txt," is an extension that indicates that the file is a simple text file. Thus when a user wishes to make files that are prepared by a specific application program be the saving object files, by setting conditions so that files, with file names having the extension unique to files prepared by the application program, are recognized as the saving object files, saving unit 160 can be made to execute automatic selection of the saving object files based on this condition setting.

(2) Performing the Restoring Process as Necessary

Though with the above-described basic embodiment, an example, where all files F1, F2, and F3 that had been saved previously are restored immediately into data storage unit 110 when user AAA performs the logon procedure, was described, the restoring process does not necessarily have to be executed on all of the saving object files and it is sufficient that the restoring process be performed as necessary. Consider, for example, the case where saving object files F1, F2, and F3, stored in folder B, are saved into external storage device 300 along with the entirety of folder B as in FIG. 3. In this case, when user AAA performs logon again, an environment equivalent to that of the previous logon is restored by copying and restoring saving object files F1, F2, and F3 along with folder B as a whole into data storage unit 110. However, the restoring process performed via network 200 is a factor that applies a workload on information processing apparatus 100, and if the data volume to be restored is large, a problem, such as the lowering of the response of information processing apparatus 100, may occur during the restoring process.

Here, if user AAA, who had logged on again, logs off after executing some renewing process on file F2, the only file that actually needed to be restored is file F2 and the restoring process of files F1 and F3 is wasteful. In this case, it is sufficient that just file F2, which is worked on by user AAA, be restored. However, if restoration of files F1, F2, and F3 is not carried out whatsoever, since files F1, F2, and F3 do not exist inside data storage unit 110 to start with, the existence of files F1, F2, and F3 will not be indicated even on the file list and user AAA cannot even designate file F2 as a task object. That is, in just the state of FIG. 3(b) as it is, since only folders A and C exist inside data storage unit 110, even if a file list is displayed as shown in FIG. 2, neither folder B nor files F1, F2, and F3 stored therein will be displayed.

To resolve this problem, restoring unit 170 is provided with restoring functions of two steps. That is, a restoring function of a first step is a preliminary restoring process of restoring the hierarchical structure at the time of storage of the data files, and a restoring function of a second step is a main restoring process of actually restoring a specific data file selected from within the hierarchical structure restored by the preliminary restoring process.

Figure 4:
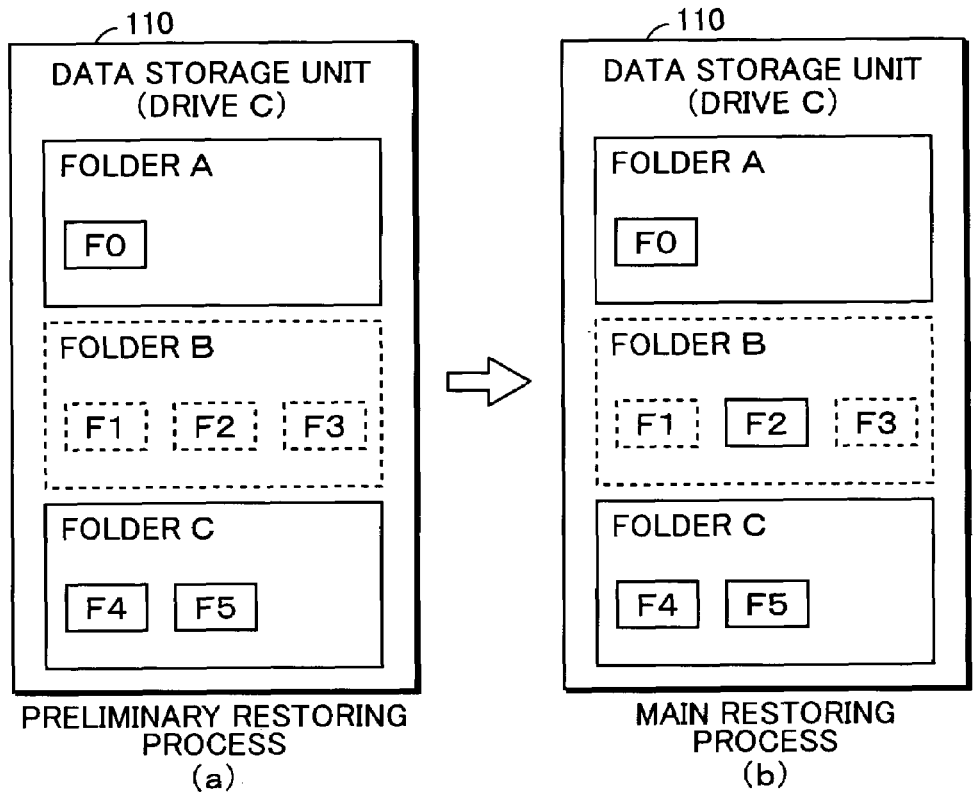
FIG. 4 is a diagram for describing concepts of two-step restoring functions of a restoring unit 170 of information processing apparatus 100 shown in FIG. 1.

FIG. 4 is a diagram for describing concepts of the two-step restoring functions. First, in the preliminary restoring process of the first step, just the hierarchical structure at the time of storage of the data files is restored. That is, just the hierarchical structure of folder B, that had been subject to saving, is restored as shown in FIG. 4(a). For the sake of convenience, folders and files, for which just the hierarchical structure is restored, are indicated by blocks of broken lines in the FIGURE. At the step of the preliminary restoring process shown in FIG. 4(a), restoration of the actual data of files F1, F2, and F3 is not performed. However, since the hierarchical structure (hierarchical structure including folder names and file names), indicating that files F1, F2, and F3 are stored inside folder B, is restored, when a file list display is performed as shown in FIG. 2, the hierarchical structure, indicating the existence of folder B and the storage of files F1, F2, and F3 therein, can be displayed.

Thus in the preliminary restoring process, since the actual data of files F1, F2, and F3 do not need to be copied into data storage unit 110 and it is sufficient that just the information, indicating the hierarchical structure that the file with the name, "file F1," the file with the name, "file F2," and the file with the name, "file F3," are stored in the folder with the name, "folder B," be restored in data storage unit 110, the volume of data to be restored is reduced significantly. Though if bibliographic data, such as the sizes and modification dates of the respective files, must be displayed as shown in window W2 of FIG. 2, these bibliographic information must also be restored, even then, the volume to be restored is reduced significantly.

If the preliminary restoring process is thus executed as the restoring process of the first step, since a file list, such as shown in FIG. 2, can be displayed to the user, the file structure stored in data storage unit 110 can be made to appear as if being equal to the state immediately before the previous logoff. By viewing the display of the file list, such as shown in FIG. 2, the user can actually check the state of the three folders A, B, and C being stored in data storage unit 110 and can also check the state of files F1, F2, and F3 being stored inside folder B.

Such a file list display as shown in FIG. 2 cannot be performed by standard functions of the OS equipped in a personal computer or other information processing apparatus 100. That is, since the restoration of the files in folder B into data storage unit 110 is not actually performed and just the data indicating the hierarchical structure are written in a predetermined format, a specialized application program that serves a function of interpreting the predetermined format and displaying the hierarchical structure as a file list on a window such as that shown in FIG. 2 is needed. Restoring unit 170 is thus a component that includes such a specialized application program.

Suppose that the user provides an instruction to spread file F2 onto memory 130 by double-clicking the icon of file F2 on window W2 shown in FIG. 2 (or provides an instruction to open file F2 from a predetermined application program). In this case, since the actual entity of file F2 does not yet exist in data storage unit 110 as shown in FIG. 4(a), the process of immediately spreading file F2 onto memory 130 cannot be performed. Instead, restoring unit 170 executes the main restoring process on file F2. That is, the process of referencing the management information inside portable information recording medium 400 to recognize the saving location address of file F2 and actually restoring the data file that is the actual entity of file F2 into data storage unit 110 is performed. FIG. 4(*b*) is a diagram that shows the state of the interior of data storage unit 110 after such a main restoring process has been performed. Though the actual entities of files F1 and F3, indicated by the broken lines, are still in the state of not being restored, since the actual entity of file F2, indicated by the solid lines, is restored in data storage unit 110, this can be spread onto memory 130.

From the user's viewpoint, a task of simply opening the desired file F2 by the predetermined application program is performed and the user is not made aware that the above-described main restoring process is performed. In other words, the operability as viewed by the user is substantially the same as the operability of a general, conventional personal computer. Here, when the user performs some form of renewing process on data file F2, spread on memory 130, by performing certain operations on program executing unit 150 and thereafter performs an operation of storing the file, the renewed data file F2 is overwritten onto data file F2 inside data storage unit 110. If the user performs the logoff procedure at this point, data file F2, which actually exists inside data storage unit 110, is recognized as the saving object file and the saving process is executed by saving unit 160. And of the management information inside portable information recording medium 400, the saving location address of data file F2 is rewritten.

By the above operation, since the main restoring process is executed on just data file F2 that needed to be actually restored and the saving process is executed on just this data file F2 at the time of logoff, a more efficient operation is enabled in comparison to the method of restoring all data files in a batch and saving all data files in a batch.

(3) Dividing Process and Encrypting Process of Saving Object Files

When the saving process by the present invention is performed, since saving object files do not remain inside information processing apparatus 100, adequate security is ensured as far as information processing apparatus 100 is concerned. However, since the saving object files are stored in external storage device 300, security may be compromised by access to this external storage device 300. Since for practical use, external storage device 300 can be arranged by an arbitrary storage device connected to the Internet if the Internet is used as network 200, it is in fact impossible to know the saving location of a specific saving object file as long as the management information in portable information recording medium 400 is not referenced. Thus as long as each individual user properly manages portable information recording medium 400 that he/she owns, the danger that the saving locations of saving object files will leak to the exterior is low. In particular, if an IC card is used as portable information recording medium 400, the possibility that the management information stored in the interior will be read out to the exterior by an illicit means is extremely low.

However, since external storage device 300 is in an environment connected to the Internet, it may be a target of a direct attack by somebody and there is a possibility that the saving object files will be read out to the exterior as they are by an illicit means. In order to accommodate for such a problem, a dividing process or an encrypting process is preferably applied to the saving object files. Such countermeasures shall now be described using specific examples.

Figure 5:
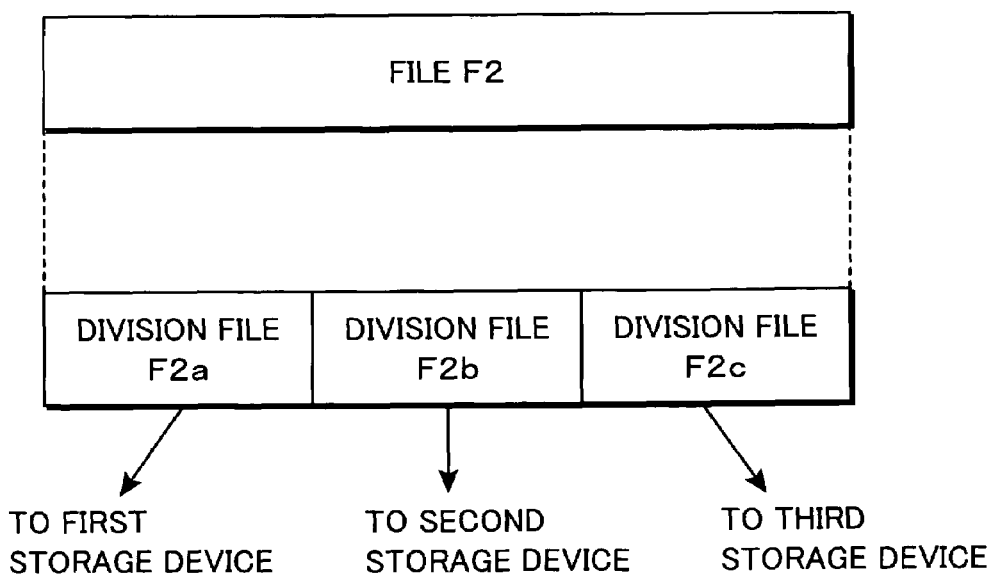
FIG. 5 is a diagram of a concept of a dividing process to be performed on a file to be saved.

FIG. 5 is a diagram of a concept of a dividing process to be performed on a saving object file. Here, an example of performing the dividing process on file F2 that has become a saving object is shown. That is, in this example, in saving file F2 in data storage unit 110 (in copying file F2 into the external storage device), saving unit 160 executes a process of dividing file F2 into three division files F2*a*, F2*b*, and F2*c*. The three division files F2*a*, F2*b*, and F2*c* are then saved into mutually different external storage devices via network 200.

Figure 6:
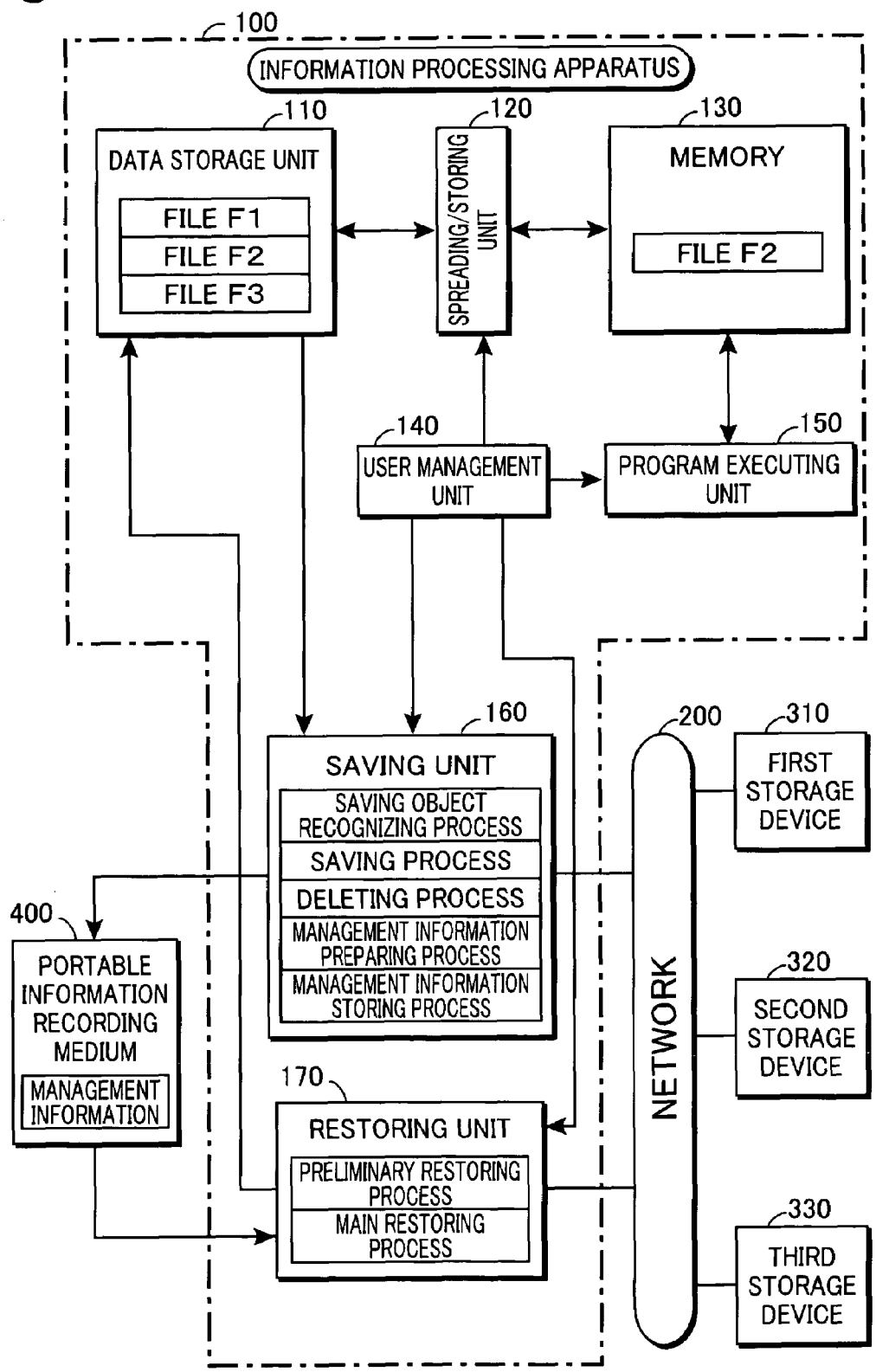
FIG. 6 is a block diagram of a modification example, in which three different storage devices are connected to a network 200 to perform the dividing process on the file to be saved.

FIG. 6 is a block diagram of a modification example, in which three different storage devices are connected to a network 200 to save the three division files F2*a*, F2*b*, and F2*c* into mutually different storage devices. The differences between the basic embodiment shown in FIG. 1 and the modification example shown in FIG. 6 is that in the latter, a first storage device 310, a second storage device 320, and a third storage device 330 are prepared as the saving locations, saving unit 160 performs the dividing process, and restoring unit 170 synthesizes the division files in performing the restoring process.

How the saving process is performed by saving unit 160 and how the restoring process is performed by restoring unit 170 shall now be described with reference to FIG. 6. Here, for the sake convenience, the description shall be made with the premise that three data files F1, F2, and F3 are stored as illustrated in data storage unit 110 at the point at which user AAA, who is logged in, performs the logoff procedure and among these files, data file F2 is the saving object file.

When user AAA performs the logoff procedure, five processes are executed by saving unit 160 as has been described above. That is, with the present example, first, data file F2 in data storage unit 110 is recognized to be the saving object file by the saving object recognizing process. Though the saving process is then performed, in this process, the dividing process is performed on data file F2, and data file F2 is copied into the external storage devices in the state of being divided into a plurality of division files. Specifically in the example shown in FIG. 5, file F2 is divided into the three division files F2*a*, F2*b*, and F2*c*, which are respectively copied into first storage device 310, second storage device 320, and third storage device 330.

When this saving process is completed, the deleting process of deleting data file F2 inside data storage unit 110 is performed. The management information preparing process is then performed, and the management information storing process of storing the prepared management information into portable information recording medium 400 is performed. With this modification example, there are two points that should be noted in regard to the management information prepared for data file F2.

A first point is that, as the addresses indicating the saving locations of file F2, the addresses of the three locations that became the respective saving locations of the individual division files F2*a*, F2*b*, and F2*c* are included in the management information. Specifically, a URL address indicating the storage destination of division file F2*a* inside first storage device 310, a URL address indicating the storage destination of division file F2*b* inside second storage device 320, and a URL address indicating the storage destination of division file F2*c* inside third storage device 330 are prepared as the management information. Since the management information in the present invention is information necessary for copying and restoring saving object files, which have been saved in external storage devices, into data storage unit 110, if saving object file F2 has been divided into three portions that are saved in mutually different locations, the saving location addresses of the individual division files are obviously prepared as the management information.

A second point is that information indicating the method of the dividing process applied to saving object file F2 is included in the management information. For example, since the division process shown in FIG. 5 is performed by a dividing method of "dividing saving object file F2 into three portions equally from the head in the order of division files F2a, F2b, and F2c," the information indicating this dividing method is included in the management information. By doing so, when the restoring process is performed by restoring unit 170, the division files F2a, F2b, and F2c can be synthesized and the original data file F2 can be restored by referencing the information indicating the dividing method in the management information.

Thus with this modification example in which the dividing process is applied, saving unit 160, in executing the saving process, is made to execute a process of dividing the saving object file into a plurality of division files based on a predetermined dividing method and saving the individual division files respectively into a plurality of mutually different storage devices and to prepare management information that includes the dividing method that has been implemented, and restoring unit 170 is made to restore the saving object file based on the information indicating the dividing method that is included in the management information.

A merit of this modification example lies in the point that the saving object file to be saved in external storage devices is stored not in its original form but in pieces in the form of division files. With the above-described example, because data file F2 is divided into three division files F2a, F2b, and F2c that are then stored dispersedly into three locations, even if any of the division files is accessed by an illicit means, immediate disclosure of the original data file F2 itself can be prevented.

With this modification example, a more complex dividing method may be employed to increase the security effect as much as possible. With the example shown in FIG. 5, since a simple dividing method of dividing the original file F2 into three equal portions is employed, if all division files F2a, F2b, and F2c happen to be obtained by an illicit means, the original file F2 can be restored by synthesizing the division files in order. On the other hand, if for example, a dividing method is employed in which, though the original file is divided likewise into three files, first division file F2a is prepared by extracting one byte at a time in a three-byte cycle from the head of the byte string making up the original file F2, that is, by extracting the 1st byte, 4th byte, 7th byte, 10th byte, and so forth, second division file F2b is prepared by extracting one byte at a time in a three-byte cycle in the manner of the 2nd byte, 5th byte, 8th byte, 11th byte, and so forth, and third division file F2c is prepared by extracting one byte at a time in a three-byte cycle in the manner of the 3rd byte, 6th byte, 9th byte, 12th byte and so forth, it will be difficult for a person who does not know that such a dividing method was performed to restore the original file F2 even if the three division files F2a, F2b, and F2c are obtained.

Actually a countless number of such dividing principles exist, and dividing methods based on the same principles can be made into practically different dividing methods by variously changing parameter values. Thus by defining a plurality of dividing methods in saving unit 160 in advance and arranging so that parameters are set randomly, one dividing method among a practically countless variety of dividing methods can be selected and respective saving object files can be saved upon being subject to mutually different dividing methods.

Also, though FIG. 6 shows an example where three storage devices 310, 320, and 330 are used as the external storage devices, if the Internet is used as network 200, an infinite number of such external storage devices can be set up in theory. Thus even if there is a possibility for each of these external storage devices to be accessed by an illicit means, as long as the management information (which is stored only inside portable information recording medium 400 owned by the user), which indicates by which dividing method a specific saving object file has been divided into how many portions and at which addresses of which storage devices the individual division files that had been generated are stored, is not available, it is impossible for a third party to restore the saving object file.

As with such a dividing process, an encrypting process is also an effective means of ensuring security. That is, saving unit 160 may be arranged to execute, in executing the saving process, a process of encrypting the saving object file based on a predetermined encrypting method and then saving the file into the external storage device and to prepare management information including information indicating the encrypting method, and restoring unit 170 may be arranged to execute, in restoring the saving object file, a decrypting process based on the information indicating the encrypting method that is included in the management information.

For example, if data file F2 is the saving object, the predetermined encrypting process is applied to this data file F2 to generate an encrypted file FF2, and this encrypted file FF2 is copied and stored into the external storage device. In this process, information indicating which encrypting process was applied (if some form of key was used for the encryption, information including the key) is included in the management information. By doing so, even if encrypted file FF2 stored in the external storage device is accessed illicitly, as long as the encryption cannot be decoded, a security problem will not arise. Obviously, when the proper user logs on, since the decrypting process can be performed on encrypted file FF2 based on the information indicating the encrypting method that is included in the management information in portable information recording medium 400, the original data file 2 can be restored.

Obviously to ensure security of an even higher degree, the dividing process and the encrypting process may be combined. For example, after dividing the saving object file to generate a plurality of division files, the individual division files can be subject respectively to the encrypting process and then saved into the external storage devices, or oppositely, after encrypting the saving object file, the encrypted file can be divided to generate a plurality of division files that are then saved into the external storage devices.

(4) Storage Location of the Management Information

In carrying out the present invention, the management information serves an important role. That is, the management information is required to restore the saving object files that had been saved into external storage devices and is essential for the restoring process by restoring unit 170. At the same time, if this management information falls into the hands of another user, the restoring of the saving object files becomes possible for this other user. Thus from the standpoint of ensuring security, the management information must be stored not inside information processing apparatus 100 but in an external storage location.

Thus with the embodiment described up until now, portable information recording medium 400, which is removable with respect to information processing apparatus 100, is used as the storage location of the management information, and when saving unit 160 stores the management information, this portable information recording medium 400 is used as the storage location, and when restoring unit 170 performs the restoring process, restoring is performed in reference to the management information stored in portable information recording medium 400. In particular, a form of operation wherein an IC card is used as portable information recording medium 400 is implemented in the above-described embodiment. Specifically, a unique IC card is issued to each individual user, and a form of operation is implemented such that the IC card must be inserted into the reader/writer device in performing the login procedure, and after the logoff procedure has been carried out, the IC card is always ejected from the reader/writer device and then carried.

However, in carrying out the present invention, the management information does not necessarily have to be stored in an IC card or other portable information recording medium 400. That is, as long as the management information can be stored in a storage location that exists outside information processing apparatus 100 and is under an environment enabling access only by the proper user, the management information does not need to be stored in portable information recording medium 400. Specifically for example, a form of operation may be implemented wherein the management information is stored in an external server device connected via network 200 and a URL address of the storage destination is notified only to the proper user. In this case, the user needs only to perform an operation of inputting the URL address in performing the login procedure. Restoring unit 170 can perform the restoring process on the necessary files by referencing the management information that exists at the input URL address.

(5) Specific Method of Constructing Information Processing Apparatus 100

For practical purposes, a representative apparatus that functions as information processing apparatus 100 shown in FIG. 1 is a personal computer. As mentioned in Section 1, of the components shown in the block diagram of FIG. 1, the functions realized by the components of data storage unit 110, spreading/storing unit 120, memory 130, user management unit 140, and program executing unit 150 are functions that are equipped as standard in a general personal computer that is presently sold commercially (a personal computer in which a predetermined OS is incorporated). Thus to use such a commercially-sold personal computer as information processing apparatus 100 according to the present invention, it suffices to add the functions of saving unit 160 and restoring unit 170 and prepare portable information recording medium 400 or other storage location for the management information. Here, the functions of saving unit 160 and restoring unit 170 can be realized by a program, and thus for practical use, data storage unit 110 according to the present invention can be arranged by incorporating a specialized program that serves the functions of saving unit 160 and restoring unit 170 into a commercially-sold, general-purpose personal computer. Obviously, this specialized program may be recorded in a CD-ROM or other computer-readable recording medium and distributed or may be distributed online.

Since the information processing apparatus according to the present invention can be realized by incorporating a specialized program in a general-purpose personal computer, it is expected that when the information processing apparatus according to the present invention is to be used in a company, etc., a form of operation, in which a plurality of information processing apparatuses are introduced at the same time and used in parallel, will be implemented in general for practical purposes. In this case, the process of restoring saving object files does not necessarily have to be performed on the same information processing apparatus on which the saving process was performed on the files.

For example, suppose that personal computers, each functioning as information processing apparatus 100 shown in FIG. 1, are installed in a Tokyo headquarters and in an Osaka branch. Suppose then that user AAA, who is an employee at the Tokyo headquarters, logs onto information processing apparatus 100 (Tokyo) that is installed in the Tokyo headquarters and performs a task of preparing data file F2, and in logging off, data file F2 is saved as a saving object file into external storage device 300. In this case, if user AAA logs onto information processing apparatus 100 (Tokyo) again at a later date, data file F2 is restored inside this information processing apparatus 100 (Tokyo). However, if this user AAA, while on a business trip to Osaka, logs onto information processing apparatus 100 (Osaka) installed in the Osaka branch, data file F2 is restored inside this information processing apparatus 100 (Osaka).

In essence, since the information concerning the saving process of data file F2, which user AAA has prepared, is stored as the management information in portable information recording medium 400 that user AAA owns, as long as user AAA carries this portable information recording medium 400, data file F2 can be restored using any information processing apparatus. Actually if the Internet is used as network 200, since external storage device 300 will be accessible from anywhere in the world, user AAA can restore data file F2 upon logging onto an information processing apparatus 100 (New York) installed in a New York branch and can also restore data file F2 upon logging onto an information processing apparatus 100 (London) installed in a London branch. The effect that data files prepared on one's own are made usable from anywhere can be said to be a subsidiary effect of the present invention that arises in the process of achieving the object of ensuring security.

INDUSTRIAL APPLICABILITY

The present invention can be used widely in cases where personal computers or other information processing apparatuses are shared among a plurality of users. In particular, the present invention is optimal for use in an environment in which adequate security is to be ensured for data prepared by each individual user in an information processing apparatus shared by a plurality of users.

The invention claimed is:

1. An information processing apparatus comprising:
a data storage unit for storing data files;
a memory for spreading data files, stored in the data storage unit, as necessary;
a user management unit, preventing simultaneous multiple logon by a plurality of users by prohibiting, after one user has performed a logon procedure to log on to said apparatus, logon procedures by other users until a logoff procedure concerning said logged-on user is performed;
a spreading/storing unit, executing, based on an operation of said logged-on user, a file spreading process of spreading a predetermined data file, stored in the data storage unit, onto the memory, and a file storing process of storing a predetermined data file, spread on the memory, into the data storage unit;
a program executing unit, executing, based on an operation of said logged-on user, a predetermined application program and a process of preparing a new data file on the memory or a renewing process on an existing data file spread on the memory;

a saving unit, executing, when said logged-on user executes the logoff procedure, a saving object recognizing process of recognizing, from among data files stored in the data storage unit, all or a predetermined portion of data files prepared or renewed based on tasks by said logged-on user as a saving object file or files, a saving process of copying and thereby saving the saving object file or files into an external storage device via a network regardless of an amount of available memory space in the data storage unit, a deleting process of deleting the saving object file or files stored in the data storage unit, a management information preparing process of preparing management information necessary for copying and restoring the saving object file or files, saved in the external storage device, into the data storage unit, and a management information storing process of storing the prepared management information into an external storage location; and a restoring unit, executing, as necessary after a specific logged-off user executes another logon procedure, a restoring process of referencing the management information and thereby copying and restoring the saving object file or files, saved in the external storage device, into the data storage unit, such that the saving object file or files prepared or renewed based on tasks by said specific user are present in the data storage unit only when said specific user is logged on.

2. The information processing apparatus according to claim 1, wherein the restoring unit executes a preliminary restoring process of restoring a hierarchical structure of data files at a time of storage, and a main restoring process of restoring a specific data file selected from within the hierarchical structure restored by the preliminary restoring process.

3. The information processing apparatus according to claim 1, wherein the saving unit recognizes a data file that is stored in a previously determined saving object folder as being the saving object file.

4. The information processing apparatus (100) according to claim 1, wherein the saving unit recognizes a data file, having a file name with a previously determined extension attached thereto, as being the saving object file.

5. The information processing apparatus according to claim 1, wherein the saving unit, in executing the management information storing process, stores the management information into a removable, portable information recording medium, and the restoring unit, in executing the restoring process, references the management information stored in the portable information recording medium.

6. The information processing apparatus according to claim 1, wherein address information on the external storage device that is to be a saving destination of the saving object file is used as the management information.

7. The information processing apparatus according to claim 1, wherein the saving unit executes, in executing the saving process, a process of dividing a saving object file into a plurality of division files based on a predetermined dividing method and saving the individual division files respectively into mutually different storage devices and has a function of preparing management information that includes information indicating the predetermined dividing method, and the restoring unit restores the saving object file based on the information indicating the predetermined dividing method that is included in the management information.

8. The information processing apparatus according to claim 1, wherein the saving unit executes, in executing the saving process, a process of saving a saving object file into the external storage device upon encrypting the file based on a predetermined encrypting method and has a function of preparing management information that includes information indicating the predetermined encrypting method, and the restoring unit restores the saving object file by executing a decrypting process based on the information indicating the predetermined encrypting method that is included in the management information.

9. The information processing apparatus according to claim 1, wherein in executing the deleting process, the saving unit performs a process of deleting even a saving object file that is spread in the memory.

10. A computer readable storage medium including a program that makes a computer function as the information processing apparatus according to claim 1.

11. A method for ensuring security of data according to each individual user when an information processing device, comprising:

a data storage unit for storing data files;

a memory for spreading a data file, stored in the data storage unit, as necessary;

a user management unit, preventing simultaneous multiple logon by a plurality of users by prohibiting, after one user has performed a logon procedure to log on to said device, logon procedures by other users until a logoff procedure concerning said logged-on user is performed;

a spreading/storing unit, executing, based on an operation of said logged-on user, a file spreading process of spreading a predetermined data file, stored in the data storage unit, onto the memory, and a file storing process of storing a predetermined data file, spread on the memory, into the data storage unit; and a program executing unit, executing, based on an operation of said logged-on user, a predetermined application program and a process of preparing a new data file on the memory or a renewing process on an existing data file spread on the memory;

is shared by a plurality of users, the method for ensuring security in information processing apparatus making the information processing apparatus perform:

a saving step of executing, when said logged-on user executes a logoff procedure, a saving object recognizing process of recognizing, from among data files stored in the data storage unit, all or a predetermined portion of data files prepared or renewed based on tasks by said logged-on user as a saving object file or files, a saving process of copying and thereby saving the saving object file or files into an external storage device via a network regardless of an amount of available memory space in the data storage unit, a deleting process of deleting the saving object file or files stored in the data storage unit, a management information preparing process of preparing management information necessary for copying and restoring the saving object file or files, saved in the external storage device, into the data storage unit, and a management information storing process of storing the prepared management information into an external storage location; and a restoring step of executing, as necessary after a specific logged-off user executes another logon procedure, a restoring process of referencing the management information and thereby copying and restoring the saving object file or files, saved in the external storage device, into the data storage unit, such that the saving object file or files prepared or renewed based on tasks by said specific user are present in the data storage unit only when said specific user is logged on.

12. The security ensuring method according to claim 11, wherein the restoring step comprises a preliminary restoring step of restoring a hierarchical structure of data files at a time of storage, and a main restoring step of restoring a specific data file selected from within the hierarchical structure restored by the preliminary restoring step.

13. A computer readable storage medium including a program that makes a computer execute the saving step and the restoring step of the security ensuring method according to claim 11.

* * * * *